United States Patent [19]

Meier

[11] Patent Number: 5,617,440
[45] Date of Patent: Apr. 1, 1997

[54] DEVICE FOR HOLDING A CYLINDRICAL LASER TUBE IN A STABLE RADIATION DIRECTION

[75] Inventor: Dietrich Meier, Niedererlinsbach, Switzerland

[73] Assignee: Leica AG, Heerbrugg, Switzerland

[21] Appl. No.: 392,748

[22] PCT Filed: Jul. 5, 1994

[86] PCT No.: PCT/EP94/02203

§ 371 Date: Mar. 8, 1995

§ 102(e) Date: Mar. 8, 1995

[87] PCT Pub. No.: WO95/02265

PCT Pub. Date: Jan. 19, 1995

[30] Foreign Application Priority Data

Jul. 8, 1993 [DE] Germany .......................... 43 22 723.6

[51] Int. Cl.⁶ .................................................. H01S 3/03
[52] U.S. Cl. ........................ 372/61; 372/65; 372/34
[58] Field of Search ................................. 372/34, 65, 61, 372/87, 92; 350/405

[56] References Cited

U.S. PATENT DOCUMENTS

| | | | |
|---|---|---|---|
| Re. 31,279 | 6/1983 | Mefferd et al. | 372/34 |
| 3,541,300 | 11/1970 | Stadnik et al. | 372/34 |
| 3,619,809 | 11/1971 | Ozzimo et al. | 372/34 |
| 3,753,149 | 8/1973 | Kindl et al. | 372/34 |
| 3,763,442 | 10/1973 | McMahan | 372/34 |
| 4,318,056 | 3/1982 | Sze | 372/61 |
| 4,365,335 | 12/1982 | Lamboo | 372/34 |
| 4,601,038 | 7/1986 | Guch, Jr. | 372/34 |
| 4,625,317 | 11/1986 | Kolb et al. | 372/87 |
| 4,637,028 | 1/1987 | Kahan | 372/34 |
| 4,671,624 | 6/1987 | Kahan | 350/405 |
| 4,833,685 | 5/1989 | Boscolo et al. | 372/61 |
| 4,858,244 | 8/1989 | Nordhauds | 372/65 |
| 4,935,938 | 6/1990 | Gressly et al. | 382/98 |
| 4,953,172 | 8/1990 | Gurski | 372/34 |
| 4,991,180 | 2/1991 | Yamaguchi et al. | 372/34 |
| 5,353,293 | 10/1994 | Shull | 372/34 |

FOREIGN PATENT DOCUMENTS

| | | |
|---|---|---|
| 0316664 | 5/1989 | European Pat. Off. . |
| 2832117 | 8/1989 | Germany . |
| 4119027 | 12/1992 | Germany . |
| 2001798 | 2/1979 | United Kingdom . |

OTHER PUBLICATIONS

A. Sasaki, "A Simple Method for Single–Frequency Operation and Amplitude–and Frequency–Stabilization of an Internation–Mirror He–Ne Laser", Japanese Journal of Applied Physics, vol. 22, No. 10, Oct. 1983, pp. 1538–1542.

*Primary Examiner*—Leon Scott, Jr.
*Attorney, Agent, or Firm*—Foley & Lardner

[57] ABSTRACT

A device for holding a cylindrical laser tube (3) in a stable radiation direction in the cylindrical internal space of a metallic housing (2), the internal space having a larger diameter than the laser tube (3) and O-rings (4) for mounting the laser tube (3) being fitted in the end regions of the internal space and the metallic housing (2) being mounted on a baseplate (1), characterized in that the interspace, enclosed by the O-rings, with respect to the laser tube (3) within the metallic housing (2) is filled with a thermally conducting paste (16), controllable heating and cooling elements are fitted in contact with the outer wall of the housing (2) and the housing (2) is mounted on the baseplate (1) in a fixed location only on one end.

12 Claims, 1 Drawing Sheet

DEVICE FOR HOLDING A CYLINDRICAL LASER TUBE IN A STABLE RADIATION DIRECTION

The invention relates to a device for holding a cylindrical laser tube in a stable radiation direction in the internal space of a metallic housing, the internal space having a larger diameter than the laser tube and O-rings for mounting the laser tube being fitted in the end regions of the internal space and the metallic housing being mounted on a baseplate.

Cylindrical laser tubes, especially for HeNe gas discharge lasers, are nowadays obtainable as operationally ready, sealed units with fused-on resonator mirrors. The currently emitted wavelength of the laser is also dependent on the spacing and the inclination of the mirrors with respect to one another. The spacing of the mirrors can be controlled by means of thermal expansion of the laser tube. The metallic housing serves as an oven for setting the temperature of the laser tube. The heating is intended to avoid stressing the laser tube, in order not to vary the inclination of the mirrors with respect to one another.

The direction of the laser beam depends on the mounting of the laser tube in the housing. For a low-stress mounting of the laser tube, springs or elastic O-rings are provided (DE 28 32 117 C2, SIEMENS Publication B6-P 8808 "Für die HeNe-Lasertechnik: Röhre, Module, Stromversorgungen [Tubes, Modules, Power supplies], Issue 2, page 10"). Thermal gradients in the metallic housing can, however, lead to stresses which cannot be accommodated by the O-rings. In addition, because of external thermal radiation from the housing or cooling air streams, thermal gradients can be produced in the baseplate, which likewise influence the longitudinal directional stability of the housing and thus of the laser beam axis. Vibrations of the system can also lead to transverse displacements of the laser tube in the elastic O-rings.

Lasers of the abovementioned type are, for example, used in coordinate measuring technology. For precise length measurements, especially using interferometric methods and accuracies, a stabilization of the laser wavelength is a basic precondition. For angle measurements, especially polar angle measurements, the stability of the radiation direction is of the greatest importance.

SUMMARY OF THE INVENTION

The invention was therefore based on the object of equipping the known mounting with improved temperature control, and providing small temperature gradients and more stable longitudinal directional mounting of the laser tube.

This object is achieved in the case of a device of the type mentioned at the outset, according to the invention, by means of the characterizing features of claim 1. Advantageous refinements are yielded by the features of the dependent claims.

By means of filling a soft, thermally conducting compound into the interspace between the inner housing wall and the laser tube, a good temperature distribution is achieved by means of thermal conduction. The O-rings are simultaneously used as a holder for the laser tube and as a seal for the thermally conducting compound. The compound filled in additionally stabilizes the laser tube against transverse displacements and equalizes temperature gradients. The temperature control by means of thermal conduction also makes possible the removal of heat from the system by means of cooling elements fitted on the outer wall of the housing. By means of the cooling capability, a temperature control range is also available which lies below the ambient temperature, so that the working temperature of the housing, serving as an oven, can be set to the ambient temperature. The connection, in a fixed position on only one side, of the housing to the baseplate allows different thermal expansions between the two components, without these leading to a stressing of the longitudinal axis of the housing.

The use of Peltier elements, which can heat and cool, is of especial advantage. In the case of a symmetrical arrangement of a plurality of Peltier elements on the outer wall of the housing, the size of the individual elements can be kept relatively small. In the case of a predetermined housing length, relatively large cooling bodies having outward-pointing cooling ribs can then still be allocated to the individual elements, for thermal dissipation.

By means of the mounting of the housing on thermally insulating feet, thermal conduction to the baseplate is largely avoided. Additional thermally insulating coatings on the housing and baseplate also prevent a thermal transfer by means of thermal radiation.

BRIEF DESCRIPTION OF THE DRAWINGS

An exemplary embodiment of the device according to the invention is shown schematically in the drawing and is described in more detail using the figures, in which, in detail.

DESCRIPTION OF EXEMPLARY EMBODIMENT

Figure 1:
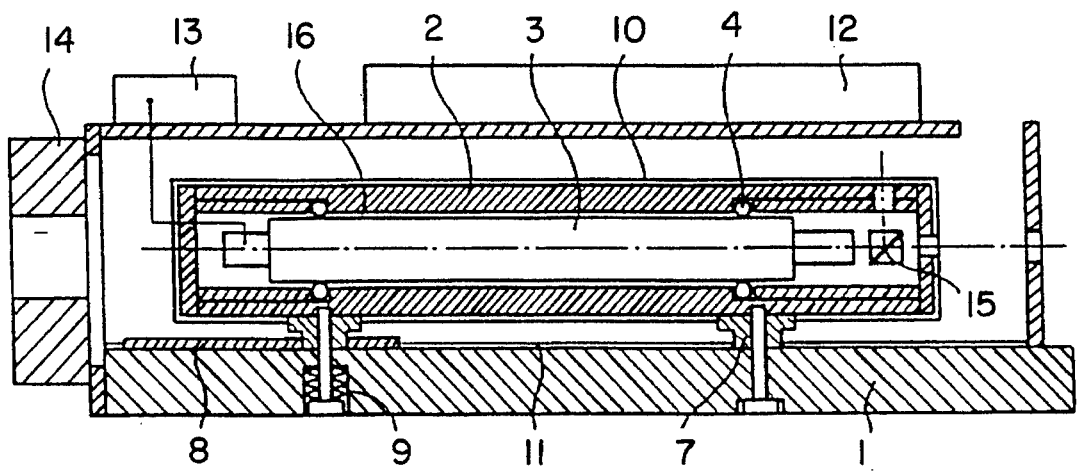
FIG. 1 shows a cross section through the device.

FIG. 1 shows the baseplate 1, the housing 2 and the laser tube 3. The housing comprises, for example, aluminum and the laser tube comprises glass. In the end regions of the housing 2, O-rings 4 are fitted, which hold the laser tube 3. The housing is also closed at the ends and has a light exit opening only at the right side. The interspace, enclosed by the O-rings 4, between the housing 2 and the laser tube 3 is filled up with a thermally conducting paste 16.

Figure 2:
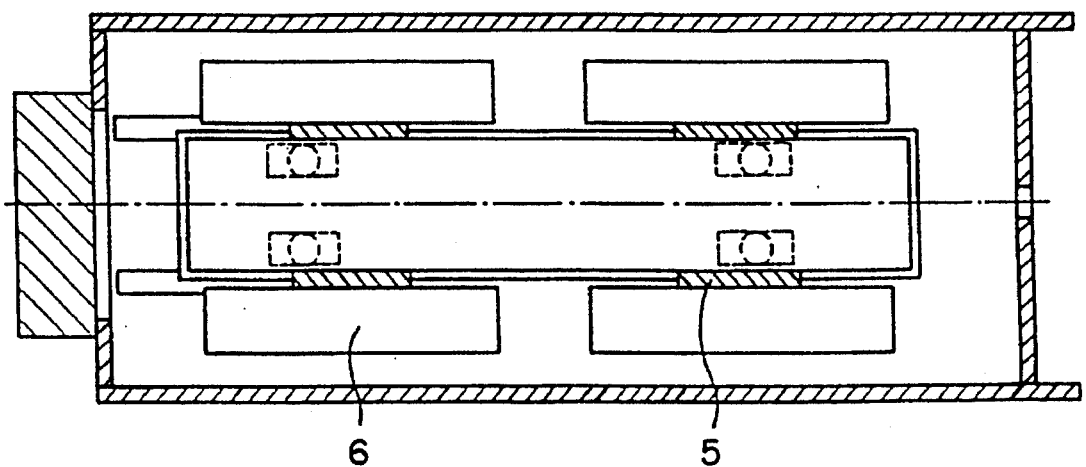
FIG. 2 shows a top view.

The housing 2 has a quadratic cross section, so that the Peltier elements 5 rest on flat surfaces, as can be seen from FIG. 2. Large-area cooling bodies 6 are allocated to the Peltier elements.

The housing 2 is connected in a fixed manner to the baseplate 1, on the light exit side, via a foot 7 made of steel of low thermal conductivity. A screw, with springs 9 placed underneath, holds the foot on the other side. This foot can therefore glide in a longitudinal guide 8 and can compensate mutual thermal expansions between baseplate 1 and housing 2. For shielding the thermal radiation, the housing 2 is provided with a thermally insulating coating 10 and the baseplate 1 is provided with insulation 11.

The entire construction is surrounded by a jacket, into which cold air is blown from one side via a fan 14 and keeps the cooling bodies 6 at ambient temperature. The control electronics 12 for the laser mode control and the energy supply 13 for operating the laser are arranged on the outside of this jacket.

Figure 3:
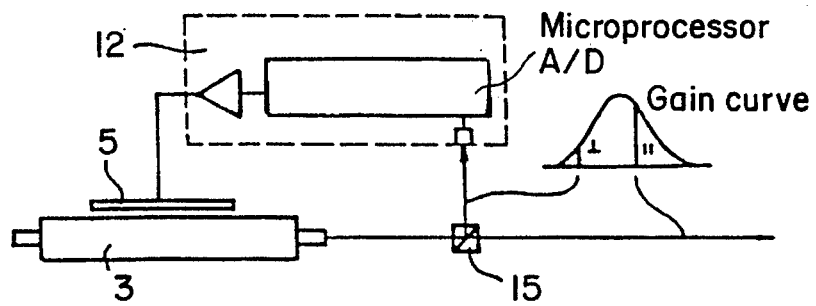
FIG. 3 shows a functional diagram of the wavelength stabilization.

The schematic functional diagram of the wavelength stabilization is shown in FIG. 3, specifically using the example of a relatively short laser tube 3, in which only two linearly polarized modes, oscillating at right angles to each other, occur under the gain curve of the laser. Both longitudinal modes have a slightly different wavelength, of which only one can be used for interferometric measurements. Using a polarizing beam splitter 15 at the outlet and outside the laser tube 3, the light from the two modes is separated. The intensity of the beam component deflected by 90 degrees is measured, converted from analog to digital form and used for controlling the control current of the Peltier elements 5 via a microprocessor. The microprocessor control is designed such that the coupled-out light intensity is kept constant. In this arrangement, the modes underneath the gain curve of the laser are advantageously displaced via the operating temperature of the housing 2 in such a way that the intensity of the coupled-out light component is significantly smaller than that of the useful light component.

I claim:

1. A device for holding a cylindrical laser tube in a stable radiation direction in an internal space of a housing, the internal-space having a larger diameter than the laser tube, the device comprising:

O-rings, for mounting the laser tube, fitted in end regions of the internal space;

a baseplate on to which the housing is mounted;

a thermally conducting paste in said internal space between said laser tube and said housing; and controllable heating and cooling elements in contact with an outer wall of the housing.

2. A device according to claim 1, wherein said heating and cooling elements include at least one Peltier element.

3. A device according to claim 2, wherein said heating and cooling elements include a plurality of Peltier elements in a symmetrical arrangement.

4. A device according to claim 3, wherein a cooling body with outward-pointing cooling ribs is coupled to the Peltier elements.

5. A device according to claim 2, wherein a cooling body with outward-pointing cooling ribs is coupled to said Peltier element.

6. A device according to claim 1, wherein the housing is supported by the baseplate via a thermally insulating foot.

7. A device according to claim 1, wherein an outer wall of the housing, with the exception of contact surfaces for the heating and cooling elements, is provided with a thermally insulating coating.

8. A device according to claim 1, wherein the baseplate, with the exception of bearing points for the housing, is provided with a thermally insulating coating.

9. A device according to claim 1, wherein the housing has a virtually quadratic cross section.

10. A device according to claim 1, wherein the housing is fixedly mounted to the baseplate at only one end.

11. A device, comprising:

a laser tube having a first end and a second end;

a housing around the laser tube;

a first seal provided between the laser tube and the housing near the first end of the laser tube, and a second seal provided between the laser tube and the housing near the second end of the laser tube;

the laser tube, the housing, and the first and second seals forming boundaries of an internal space;

a thermally conducting paste provided in said internal space to conduct heat; and at least one heating/cooling element, coupled to said housing, to control the temperature of said housing.

12. A device according to claim 11, further comprising a baseplate, wherein said housing and said baseplate are rigidly fixed together at only one point to minimize thermal stress in said housing.

* * * * *